(12) United States Patent
Ossberger et al.

(10) Patent No.: US 11,156,512 B2
(45) Date of Patent: Oct. 26, 2021

(54) STRAIN GAUGE AND METAL STRIP HAVING A STRAIN GAUGE OF THIS KIND

(71) Applicant: voestalpine Stahl GmbH, Linz (AT)

(72) Inventors: Gerald Ossberger, Leonding (AT); Norbert Gstöttenbauer, Engerwitzdorf (AT); Bernhard Jakoby, Linz (AT); Wolfgang Hilber, Leopoldschlag (AT); Johannes Sell, Linz (AT); Herbert Enser, Linz (AT)

(73) Assignee: voestalpine Stahl GmbH, Linz (AT)

( * ) Notice: Subject to any disclaimer, the term of this patent is extended or adjusted under 35 U.S.C. 154(b) by 0 days.

(21) Appl. No.: 16/617,901

(22) PCT Filed: May 29, 2018

(86) PCT No.: PCT/EP2018/064120
§ 371 (c)(1),
(2) Date: Nov. 27, 2019

(87) PCT Pub. No.: WO2018/219976
PCT Pub. Date: Dec. 6, 2018

(65) Prior Publication Data
US 2020/0191666 A1   Jun. 18, 2020

(30) Foreign Application Priority Data
May 29, 2017   (EP) .................................. 17173327

(51) Int. Cl.
*G01L 1/00*   (2006.01)
*G01L 1/22*   (2006.01)

(52) U.S. Cl.
CPC .......... *G01L 1/2293* (2013.01); *G01L 1/2281* (2013.01)

(58) Field of Classification Search
CPC ............................ G01L 1/2293; G01L 1/2281
USPC ..................................................... 73/862.627
See application file for complete search history.

(56) References Cited

U.S. PATENT DOCUMENTS

| | | | | |
|---|---|---|---|---|
| 4,311,980 A | * | 1/1982 | Prudenziati | G01L 1/2287 338/2 |
| 4,430,895 A | | 2/1984 | Colton | |
| 2006/0107768 A1 | * | 5/2006 | Johnson | G01L 1/144 73/862.628 |
| 2008/0127752 A1 | * | 6/2008 | Nakano | G01L 1/2206 73/862.627 |
| 2013/0274562 A1 | * | 10/2013 | Ghaffari | A61B 5/046 600/301 |
| 2014/0241843 A1 | * | 8/2014 | Golda | H01L 21/67144 414/751.1 |

(Continued)

FOREIGN PATENT DOCUMENTS

| | | |
|---|---|---|
| WO | 2007062813 A1 | 6/2007 |
| WO | 2017028466 A1 | 2/2017 |

*Primary Examiner* — Max H Noori

(57) ABSTRACT

A strain gauge and a metal strip having such a strain gauge, which has a first measuring grid, a second measuring grid, and a substrate on which these two measuring grids are positioned in a common plane. In order to enable achievement of an inexpensive strain gauge whose measurement results can be robustly compensated for in relation to a temperature disturbance variable, it is proposed that the multi-layer substrate have a metallic layer and an electrically insulating layer onto which electrically insulating layer these two measuring grids consisting of a piezoresistive material are printed.

15 Claims, 3 Drawing Sheets

(56) References Cited

U.S. PATENT DOCUMENTS

| | | | | |
|---|---|---|---|---|
| 2017/0254795 A1* | 9/2017 | Qian | ............... | G01N 33/4833 |
| 2017/0277341 A1* | 9/2017 | Lim | ............... | H01L 27/323 |
| 2017/0285864 A1* | 10/2017 | Pedder | ............... | H01L 27/323 |
| 2017/0308198 A1* | 10/2017 | Yoon | ............... | G06F 3/0445 |
| 2018/0088708 A1* | 3/2018 | Naganuma | ............... | G06F 3/0447 |
| 2018/0171854 A1* | 6/2018 | Szczepanski | ............... | F01N 11/00 |
| 2018/0188889 A1* | 7/2018 | Hong | ............... | G06F 3/03545 |
| 2019/0110747 A1* | 4/2019 | Majerus | ............... | G01L 9/0052 |
| 2020/0100859 A1* | 4/2020 | Shen | ............... | A61B 18/1492 |

* cited by examiner

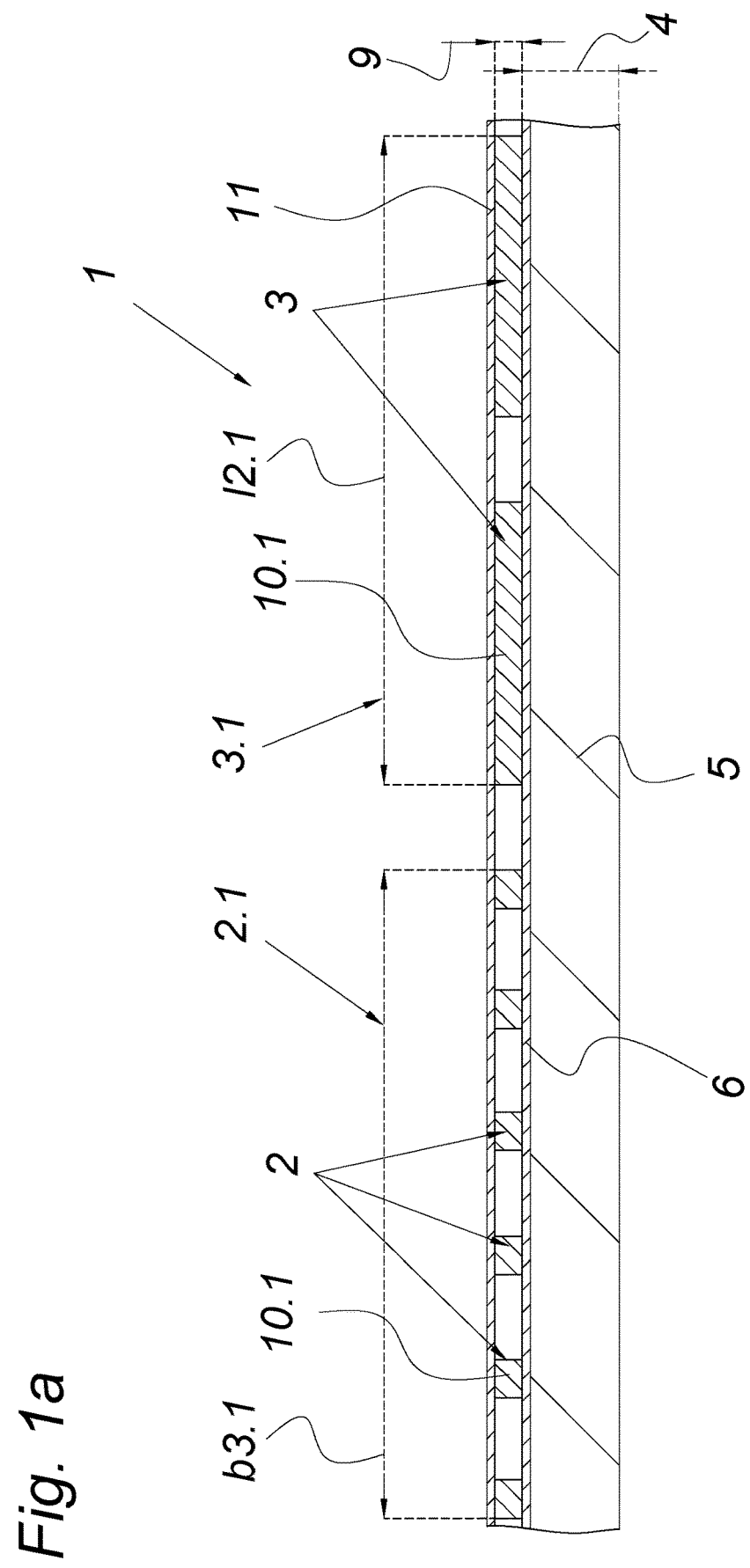

STRAIN GAUGE AND METAL STRIP HAVING A STRAIN GAUGE OF THIS KIND

FIELD OF THE INVENTION

The invention relates to a strain gauge which has a first measuring grid, a second measuring grid, and a substrate on which these two measuring grids are positioned in a common plane and also relates to a metal strip having such a strain gauge.

BACKGROUND OF THE INVENTION

Providing film strain gauges with several measuring grids laterally next to one another on a shared substrate is known from the prior art. Their measuring grids can have the same or different orientation directions, the latter also being known as "strain gauge rosettes." All film strain gauges share the fact that a measuring grid is composed of a resistive element, which is produced, for example, from a constantan film by means of an etching process, which constantan film has been previously laminated onto a plastic substrate. Film strain gauges of this kind are relatively expensive to produce and also—because of the etching process—require measuring grids that are spaced relatively far apart from one another in order to prevent short-circuits between the resistive elements.

In addition, film strain gauges produced in this way must be mechanically attached, e.g. glued, to the test object whose strain is to be measured. The glue layer can disadvantageously result in the fact that the actual strain of the test object is not sufficiently transmitted to the strain gauge.

SUMMARY OF THE INVENTION

The stated object of the invention, therefore, is to modify the design of a strain gauge having several measuring grids of the type described at the beginning in such a way that it can be inexpensively produced and its measurement data can also be robustly analyzed in relation to a temperature disturbance variable.

The invention attains the stated object in that the multi-layer substrate has a metallic layer and an electrically insulating layer onto which electrically insulating layer these two measuring grids consisting of a piezoresistive material are printed.

If the multi-layer substrate has a metallic layer and an electrically insulating layer onto which electrically insulating layer the two measuring grids consisting of a piezoresistive material are printed, then this makes it possible to achieve a production process that can be implemented in a comparatively simple and reproducible way, by means of which the measuring grids can be provided comparatively close to one another laterally. Because of this resulting spatial proximity of the two measuring grids and particularly also because of their comparatively good thermal coupling by means of the metallic layer of the substrate, it can also be consequently assumed that there is an identical temperature disturbance variable on the two measuring grids—to be precise, the electrically insulating layer with the measuring grids printed onto it is provided on the metallic layer. This opens up the possibility, by means of suitable methods such as measuring bridges or numerical methods, of performing an exact temperature compensation on the measurement result of the strain gauge.

The strain gauge according to the invention can therefore robustly counteract temperature disturbance variables, thus making it possible to ensure a high degree of measurement precision in the strain gauge.

In particular, a piezoresistive material is used for the printing of the measuring grids, for example a silver-based, graphite-based, etc. paste. A wide variety of methods can conceivably be used for this printing, for example screen printing, intaglio printing, electronic printing methods, etc.

The sensitivity to a temperature disturbance variable can be further reduced if the second measuring grid oriented at right angles to the first measuring grid is embodied as a passive measuring grid for temperature compensation of the strain measurement values of the first measuring grid for which purpose both measuring grids consist of the same piezoresistive material. By means of the right-angled orientation, the measuring grid, which is oriented normal to the orientation direction of the strain gauge, can namely be kept free of mechanical forces and can thus be used solely for recording the temperature disturbance variable—as a result of which, for example with a half-bridge or full-bridge circuit, the temperature influence can be reduced in or eliminated from the measurement result of the first measuring grid. This can be further improved if the two measuring grids consist of the same piezoresistive material.

The sensitivity of the strain gauge can be further increased if the first and second measuring grids have the same nominal resistance.

The temperature loads on the two measuring grids can advantageously be adjusted relative to each other if the first and second measuring grids each have at least one meandering grid section, with one grid section of the first measuring grid being positioned between two grid sections of the second measuring grid. According to the invention, the sensitivity of the measurement results, e.g. detected by means of a measuring bridge, can be further reduced relative to a temperature disturbance variable, thus contributing to the measurement precision of the strain gauge.

The design of the strain gauge can be simplified if each measuring grid has several meandering grid sections, which grid sections are positioned one after the other in alternating fashion. Furthermore, this more uniform distribution of grid sections can contribute to the fact that the two measuring grids are subjected to a similar temperature loading—which enables a more precise compensation in the measurement data.

The above-mentioned advantage can be especially pronounced if a grid section of the first measuring grid has several, in particular two, meandering rows extending next to each other.

If the ratio of at least one grid length of a first grid section to at least one grid width of a second grid section is 1:0.75 to 1:1.25, then the strain gauge can be robustly evaluated in relation to a temperature disturbance variable. This can be achieved particularly if this ratio is 1:0.9 to 1:1.1; of this range, 1:1 can turn out to be preferable.

If the grid sections of the respective measuring grids are embodied as identically shaped, then the design of the strain gauge can be further simplified. This is all the more true if the grid sections of the respective measuring grids are identical.

The sensitivity to a temperature disturbance variable can also be reduced with two active measuring grids on a shared substrate if the first and second measuring grids are identically oriented and, as active measuring grids, have respective piezoresistive materials with temperature coefficients that are different from each other and strain factors that are different from each other.

If the first and second measuring grids each have a meandering grid section, then the design of the strain gauge can be further simplified—thus enabling a particularly inexpensive multi-grid strain gauge.

A compact and robust strain gauge can be achieved if the grid sections are positioned one inside the other and are identically shaped. It is thus also possible to adapt the temperature level of the two strain gauges to each other and thus to improve a temperature compensation.

The above-mentioned advantage is particularly achieved if the two measuring grids extend in a double meander—and it is thus possible to ensure a uniform temperature load of the two measuring grids. The measuring grid strain gauge according to the invention can thus ensure a particularly high precision in the measurement data acquisition.

Preferably, the strain gauges can be used in a bridge circuit. In this connection, it is conceivable to interconnect the strain gauges to form half-bridges or full-bridges.

Preferably, the metallic layer of the substrate is an aluminum strip or steel strip or is a plate made of aluminum or steel. A metallic layer therefore consists of metal or alloys. This can achieve a particularly good thermal coupling between the two measuring grids.

Preferably, the electrically insulating layer of the substrate is a primer or an insulating lacquer layer or an organic or inorganic pre-coating.

The design circumstances for a strain gauge can be simplified by means of a metal strip with a coating if this metal strip constitutes the metallic layer and its coating constitutes the electrically insulating layer of the substrate. As a result, not only can the thermal coupling between the measurement grids be improved, it is also unnecessary to provide a separate glue layer between the test body and the measuring grids. According to the invention, the strain can thus be transmitted completely to the strain gauge, which can increase the measurement precision.

BRIEF DESCRIPTION OF THE DRAWINGS

The subject of the invention is shown in greater detail in the figures by way of example based on an embodiment variant. In the drawings:

In the figures, the subject of the invention is depicted in greater detail by way of example based on several embodiment variants. In the drawings:

FIG. 1a shows a partially cut-away side view according to I-I in FIG. 1.

DETAILED DESCRIPTION OF THE PREFERRED EMBODIMENTS

Figure 1:
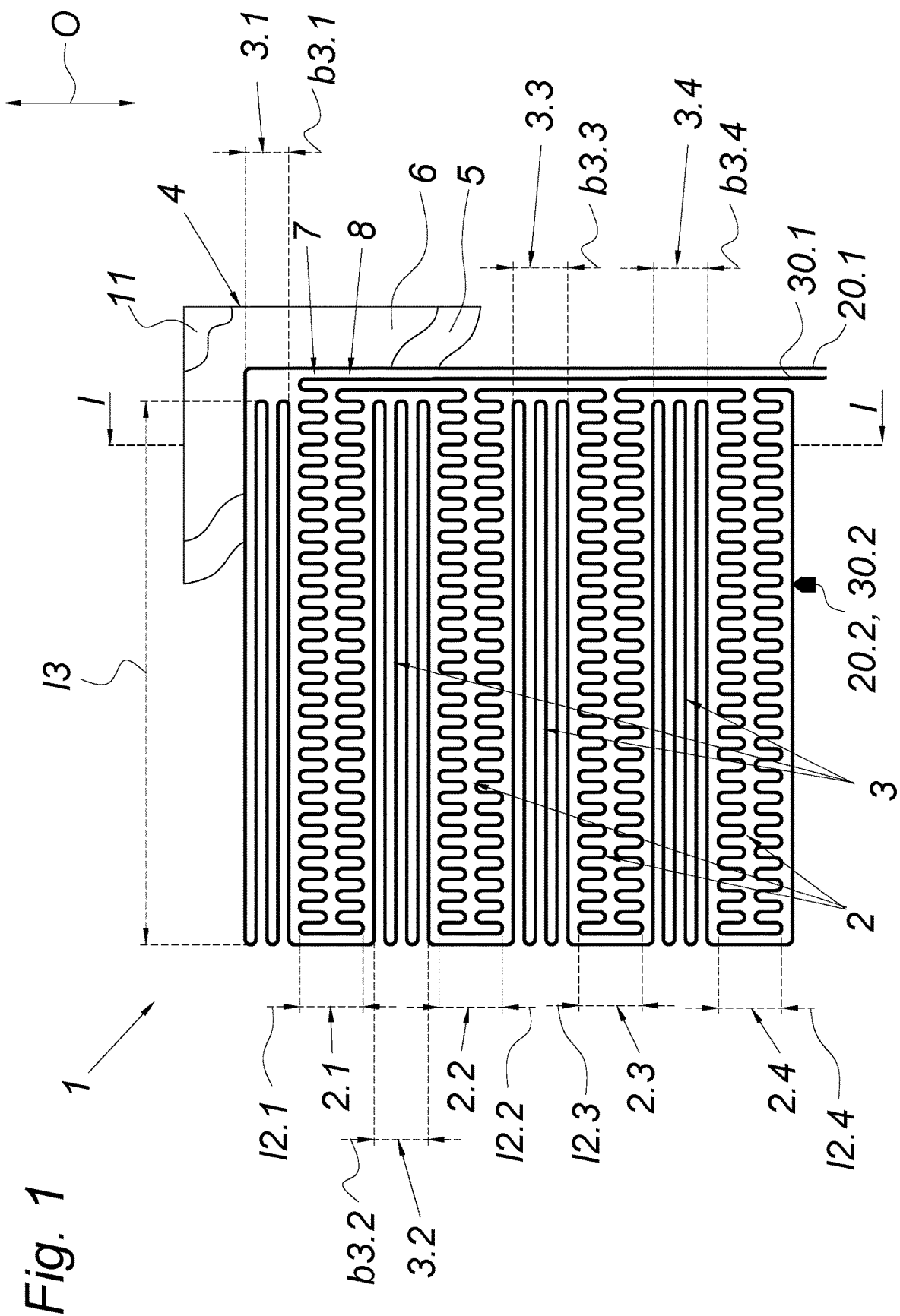
FIG. 1 shows a top view of a strain gauge having several measuring grids according to a first exemplary embodiment.

The strain gauge 1 according to a first exemplary embodiment, which is shown by way of example in FIGS. 1 and 1a, has a first measuring grid 2 and a second measuring grid 3. The first measuring grid 2 takes shape between the two connections 20.1 and 20.2—the second measuring grid 3 takes shape between the two electrical connections 30.1 and 30.2, both measuring grids 2, 3 being short-circuited at the ends to the connections 20.2 and 30.2. The two measuring grids 2, 3 are provided on a substrate 4 and positioned in a common plane 9. As is clear in FIGS. 1 and 1a, these measuring grids 2, 3 are provided laterally next to each other on the substrate 4.

According to the invention, the multi-layer substrate 4 has a metallic layer 5 and an electrically insulating layer 6, which is depicted in FIG. 1a. To achieve this, the electrically insulating layer 6 is positioned on the metallic layer 5.

The electrically insulating layer 6 can, for example, be a primer or an undercoat, coating, etc. of a sheet, strip, plate, slit strip, support, etc. on the metallic layer 5, which sheet, strip, slit strip, plate, support, etc. constitutes the metallic layer 5, for example. The metallic layer 5, the electrically insulating layer 6, and the two measuring grids 2, 3 and 102, 103, are positioned one above the other in layers. Preferably, the electrically insulating layer 6 covers the entire surface of the metallic layer 5.

A comparatively good thermal coupling of the two measuring grids 2, 3 and 102, 103, via the metallic layer 5 of the substrate 4 can be achieved by means of this multi-layer substrate 4, as a result of which it can consequently be assumed that an identical temperature disturbance variable is present on the two measuring grids 2, 3 and 102, 103. This also makes the measuring grids 2, 3 and 102, 103 short-circuit-proof relative to the metallic layer 5 due to presence of the electrically insulating layer 6. The substrate 4 can have other layers, which is not shown.

In addition, both of the measuring grids 2, 3 are printed onto the substrate 4, to be precise, onto the electrically insulating layer 6, which allows them to be provided close to one another without short-circuiting. For this purpose, the electrically insulating layer 6 electrically insulates the two measuring grids 2, 3 relative to the metallic layer 5 of the substrate 4. A piezoresistive material is used for the printing, for example silver-based or graphite-based pastes. The measuring grids 2, 3 are thus printed onto the electrically insulating layer 6 by a printing of the piezoresistive material.

For example, a covering lacquer 11 is provided on these two measuring grids 2, 3 and 102, 103.

The strain gauge 1 produced in this way is comparatively inexpensive and because of its compact embodiment, can also supply measurement data that can be used to robustly compensate for a temperature disturbance variable, for example by means of a bridge circuit.

As is also clear from FIG. 1, the two measuring grids 2, 3 have orientations that are different from each other—in the instance shown, these measuring grids 2, 3 are oriented at right angles. As a result, the second measuring grid 3 functions as a passive measuring grid when there is mechanical strain in the orientation direction O of the first measuring grid 2. The two measuring grids 2, 3 consist of the same piezoresistive material and preferably have the same nominal resistance R0 [Ω]. Consequently, the second mechanically unstrained measuring grid 3 can be used for the temperature compensation of the strain gauge of the first measuring grid 2—for example in that the two measuring grids 2, 3 are provided in the same half-bridge branch of a half-bridge.

The measuring grid 2 consists of four meandering grid sections 2.1, 2.2, 2.3, and 2.4, which are electrically connected in series. It is thus possible to achieve a particularly high sensitivity of the first measuring grid 2 to mechanical strains in the orientation direction O.

The measuring grid 3 is composed of four meandering grid sections 3.1, 3.2, 3.3, and 3.4, which are electrically connected in series. Because a grid section 2.2 of the first measuring grid 2 is positioned between grid sections 3.1 and 3.2 of the second measuring grid 3, a virtually identical temperature influence on the two measuring grids 2 and 3 is established—which makes it possible to largely minimize the influence of the temperature disturbance variable on the measurement result by using measuring grids 2 and 3 in a joint half-bridge, not shown. The latter is achieved in a particularly advantageous way since the grid sections 2.1, 2.2, 2.3, 2.4 and 3.1, 3.2, 3.3, 3.4 are positioned next to one another in alternating fashion and are connected to one another, as shown in FIG. 1.

It is also clear from FIG. 1 that the grid sections 2.1, 2.2, 2.3, and 2.4 of the first measuring grid 2 each have two meandering rows 7, 8 extending next to each other. In addition, all of the grid lengths 12.1, 12.2, 12.3, 12.4 of the first grid sections 2.1, 2.2, 2.3, 2.4 are essentially the same length as all of the grid widths b3.1, b3.2, b3.3, b3.4 of the second grid sections 3.1, 3.2, 3.3, 3.4—making it possible to meet preferred requirements of keeping the two measuring grids 2, 3 at the same temperature level.

Furthermore, the grid sections 2.1, 2.2, 2.3, 2.4 and 3.1, 3.2, 3.3, 3.4 of the respective measuring grids 2, 3 are identically embodied and thus have the same shape, which simplifies the design of the strain gauge 1.

Figure 2:
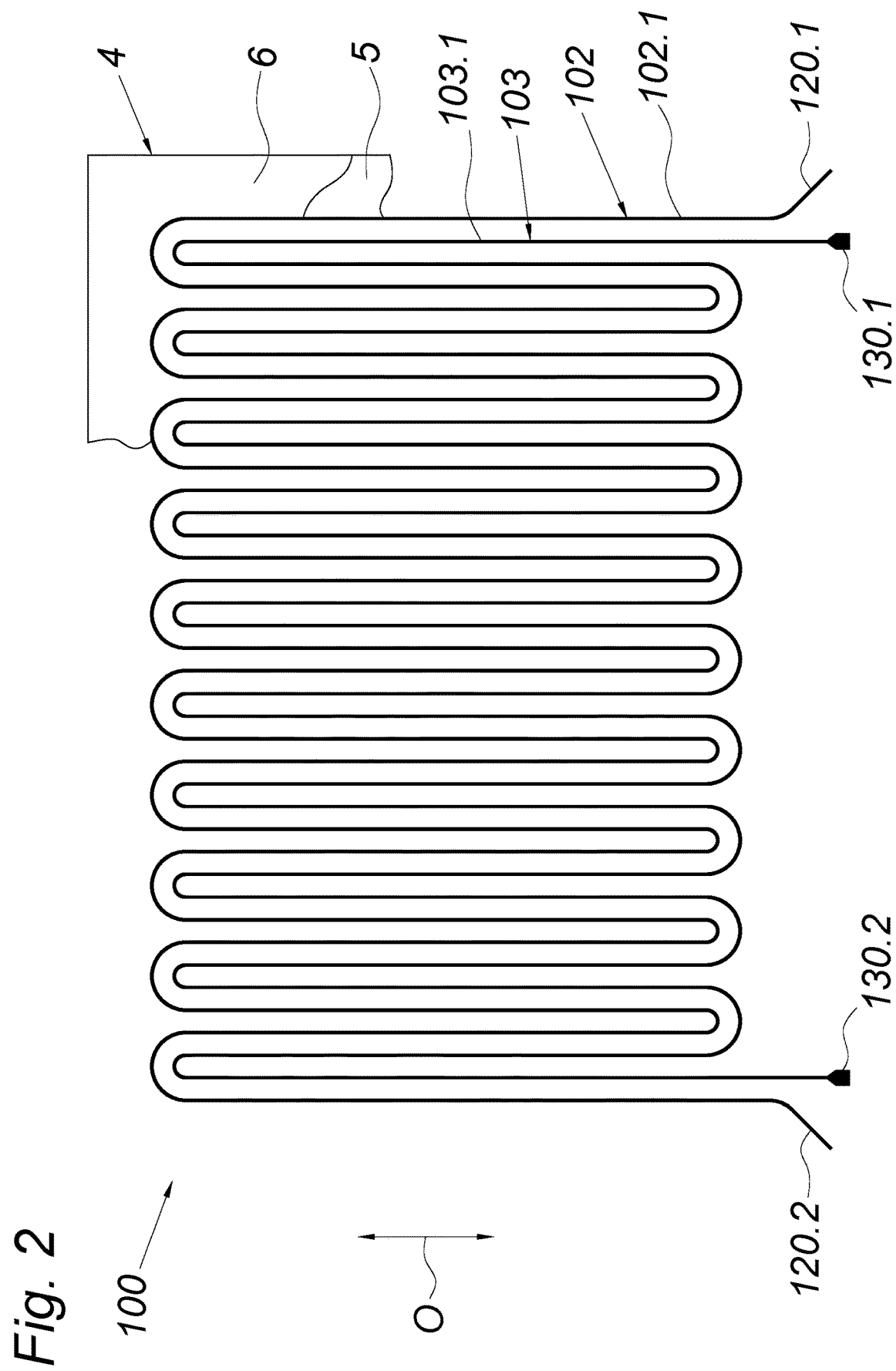
FIG. 2 shows a top view of a strain gauge having several measuring grids according to a second exemplary embodiment.

FIG. 2 shows a strain gauge 100 according to a second exemplary embodiment. This strain gauge 100 has a first measuring grid 102 and a second measuring grid 103, which are positioned one inside the other and whose shapes mesh with each other.

The first measuring grid 102 takes shape between the two connections 120.1 and 120.2 and the second measuring grid 103 takes shape between the two electrical connections 130.1 and 130.2. The two measuring grids 102, 103 are positioned in a common plane 9—which can, for example, be a sheet 6 or the like that is coated with a primer or an undercoat serving as an electrical insulation 5, as already described above in connection with the first exemplary embodiment.

According to the invention, the two measuring grids 102, 103 are printed onto the substrate 4, to be precise onto the electrically insulating layer 6 of the substrate 4, which substrate 4 also has a metallic layer 5. The structure of this multi-layer substrate 4 is identical to the first exemplary embodiment and can be inferred from FIG. 1a.

As a result, the two measuring grids 102, 103 can be provided close to one another without short-circuiting. Piezoresistive materials are used for the printing, for example a silver-based paste for the first measuring grid 102 and a graphite-based paste for the second measuring grid 103. The measuring grids 102, 103 are thus printed onto the electrically insulating layer 6 by a printing of the piezoresistive material.

The strain gauge 100 produced in this way can be produced relatively inexpensively and because of its compact embodiment, also has a particularly uniform temperature load of the two measuring grids. Numerical compensation methods can thus robustly remove the temperature disturbance variable from the measurement results of the strain gauge 100.

According to FIG. 2, the first and second measuring grids 102, 103 are oriented identically so that these two measuring grids 102, 103, as active measuring grids, record measurement data in the event of a mechanical strain in the same orientation direction O. The two measuring grids are therefore subject to the same temperature disturbance variable and the same strain. For the compensation of the temperature disturbance variable, the piezoresistive materials of the measuring grids 102, 103 have temperature coefficients ($\alpha 2$, $\alpha 3$) that are different from each other and strain factors (k factors: k1, k2) that are different from each other. The temperature influence in the measurement result can be compensated for by means of these differences.

For a numerical compensation of the temperature disturbance variable, the resistances $R_{102}$ and $R_{103}$ of the measuring grids 102 and 103 are measured with a suitable method, in the simplest case by means of a resistance measuring device.

For each of the measuring grids, its resistance, disregarding the higher-order dependencies on temperature and strain, can be formally described by $$R(\varepsilon,T)=R_{T_0}(1+k\varepsilon+\alpha_1(T-T_0)).$$

In this equation, $R_{T_0}$ is the nominal resistance of the respective measuring grid without strain at a reference temperature $T_0$, k is the k factor, $\alpha$ is the temperature coefficient, $\varepsilon$ is the strain, and T is the temperature of the measuring grid. Applied to the measuring grids 102 and 103, this yields an equation system consisting of two equations and the two unknown variables of temperature and strain:

$$R_{102}(\varepsilon,T)=R_{102,T_0}(1+k_1\varepsilon+\alpha_1(T-T_0))$$

$$R_{103}(\varepsilon,T)=R_{103,T_0}(1+k_2\varepsilon+\alpha_2(T-T_0))$$

By solving this equation system, it is possible to calculate the overall temperature and strain of the measuring grids 102 and 103.

This achieves a strain gauge 100 with exact measurement data.

As can also be inferred from FIG. 2, the first and second measuring grids 102, 103 each have a single meandering grid section 102.1, 103.1. These grid sections 102.1, 103.1 are positioned one inside the other and are identically shaped, as a result of which the two measuring grids 102, 103 extend in a double meander.

The invention claimed is:

1. A strain gauge comprising:
a first measuring grid;
a second measuring grid; and
a multi-layer substrate on which the first and second measuring grids are positioned in a common plane, wherein the multi-layer substrate has a metallic layer and an electrically insulating layer, the first and second measuring grids each consisting of a piezoresistive material are printed directly onto a first surface of the electrically insulating layer, and a second surface of the electrically insulating layer faces the metallic layer, and wherein the strain gauge counteracts temperature disturbance variables.

2. The strain gauge according to claim 1, wherein the second measuring grid oriented at a right angle to the first measuring grid is embodied as a passive measuring grid for temperature compensation of strain measurement values of the first measuring grid for which purpose the first and second measuring grids consist of the same piezoresistive material.

3. The strain gauge according to claim 2, wherein the first and second measuring grids have the same nominal resistance.

4. The strain gauge according to claim 2, wherein the first and second measuring grids each have at least one meandering grid section, with one grid section of the first measuring grid being positioned between two grid sections of the second measuring grid.

5. The strain gauge according to claim 4, wherein each of the first and second measuring grids has a plurality of meandering grid sections, which grid sections are positioned one after the other in alternating fashion.

6. The strain gauge according to claim 4, wherein a grid section of the first measuring grid has two meandering rows extending next to each other.

7. The strain gauge according to claim 4, wherein a ratio of at least one grid length of a first grid section to at least one grid width of a second grid section is 1:0.75 to 1:1.25.

8. The strain gauge according to claim 4, wherein the grid sections of the respective measuring grids are embodied as identically shaped, in particular as identical.

9. The strain gauge according to claim 1, wherein the first and second measuring grids are identically oriented and, as active measuring grids, have respective piezoresistive materials with temperature coefficients that are different from each other and strain factors that are different from each other.

10. The strain gauge according to claim 9, wherein the first and second measuring grids each have a meandering grid section.

11. The strain gauge according to claim 10, wherein the grid sections are positioned one inside the other and are identically shaped.

12. The strain gauge according to claim 9, wherein the two measuring grids extend in a double meander.

13. The strain gauge according to claim 1, wherein the metallic layer of the substrate is an aluminum strip or steel strip or is a plate made of aluminum or steel.

14. The strain gauge according to claim 1, wherein the electrically insulating layer of the substrate is a primer or an insulating lacquer layer or an organic or inorganic pre-coating.

15. A metal strip having a coating and having a strain gauge according to claim 1, wherein the metal strip constitutes the metallic layer of the substrate of the strain gauge and the coating on the metal strip constitutes the electrically insulating layer of the substrate of the strain gauge.

* * * * *